United States Patent [19]

Matsumoto et al.

[11] Patent Number: 4,963,919
[45] Date of Patent: Oct. 16, 1990

[54] METHOD OF SIMULATING THE LAYOUT OF COMPOSED IMAGE

[75] Inventors: Fumio Matsumoto, Tokyo; Kenji Suzuki, Kanagawa, both of Japan

[73] Assignee: Fuji Photo Film Co., Ltd., Kanagawa, Japan

[21] Appl. No.: 368,735

[22] Filed: Jun. 20, 1989

[30] Foreign Application Priority Data

Jun. 20, 1988 [JP]   Japan .................................. 63-151833

[51] Int. Cl.$^5$ .............................................. G03B 27/52
[52] U.S. Cl. ......................................... 355/40; 355/77; 355/54
[58] Field of Search ...................... 355/40, 41, 54, 77, 355/244; 354/109

[56] References Cited

U.S. PATENT DOCUMENTS 4,607,949  8/1986  Hakamada et al. .................. 355/40

Primary Examiner—Michael L. Gellner
Assistant Examiner—D. Rutledge
Attorney, Agent, or Firm—Sughrue, Mion, Zinn, Macpeak & Seas

[57] ABSTRACT

A proper layout of a composed image is simulated and conformed on a monitor screen before printing the composed image. Framing lines are displayed to define a printing area on the monitor screen according to a desired printing magnification. Two originals, which are complementarily covered, are separately placed in a printing station of a printer and shifted so as to display their images at a desired location with respect to the framing lines on the monitor screen, thereby simulating a desired layout of the two images as a composed image.

4 Claims, 5 Drawing Sheets

METHOD OF SIMULATING THE LAYOUT OF COMPOSED IMAGE

BACKGROUND OF THE INVENTION

The present invention relates to a method of simulating a layout of a composed image before printing the composed image from two originals, and more particularly to a method of locating each component image of the composed image within a printable area defined by framing lines displayed on a monitor screen.

To make photographic pictures, in particular commemorative pictures more dear or memorable, it is desirable to imprint the date and place of an event and the name of the event on a corner margin of the photographic picture or print. Imprinting a message or compliment consisting of words and/or an illustration also is desirable.

Such prints with messages, which are used as postcards, are made by a double exposure manner in a printer. That is, a first exposure is made to form a latent image of an original with a subject image photographically recorded on a photographic paper. A second exposure is made to form a latent image of another original with a message on the photographic paper as to form a composed of the two images.

Conventionally, because of the composing of the two images resulting from the double exposure, it has been hard to confirm a proper layout of the two images to be composed in advance of printing.

SUMMARY OF THE INVENTION

Therefore, it is a primary object of the present invention to provide a method of conforming a proper layout of a composed image in advance of printing.

This and other objects of the present invention are achieved to provide a method of simulating and conforming a proper layout of a composed image on a monitor screen on which framing lines are displayed to define a printable area. The framing lines are displayed so as to define a printing area according to a desired printing magnification on the monitor screen. Two originals, which are complementarily covered, are placed separately in a printing station of a printer and are shifted so as to display their images at desired locations with respect to the framing lines on the monitor screen, thereby simulating a desired layout of the two images as a composed image.

When making a print of a composed image, an original masked with a framing mask is placed in an exposure station so as to display an image of the original on a monitor screen by the use of an imaging device including an image sensor. The displayed image is adjusted in a printing area defined by framing lines displayed on the monitor screen to simulate a proper layout of the image and then an exposure is made. The same procedure is taken for another original to be composed and another exposure is made.

Because each original can be simulated with respect the framing lines, no conformity of the layout of a composed image on the monitor screen is necessary, and exposure can be made immediately after the positioning of an original in the exposure station.

The two originals may be a negative film with a photographically recorded image, a printed transparent glass plate or transparent film, a lithographic film with transparent words and/or illustrations and the like. The print is composed in a double exposure of two pictures, a picture and words, or a picture and an artificially composed message consisting of words and a computer graphic illustration. The method also is applicable to composing three different originals in triple exposure.

DETAILED DESCRIPTION OF THE PREFERRED EMBODIMENT

Figure 1:
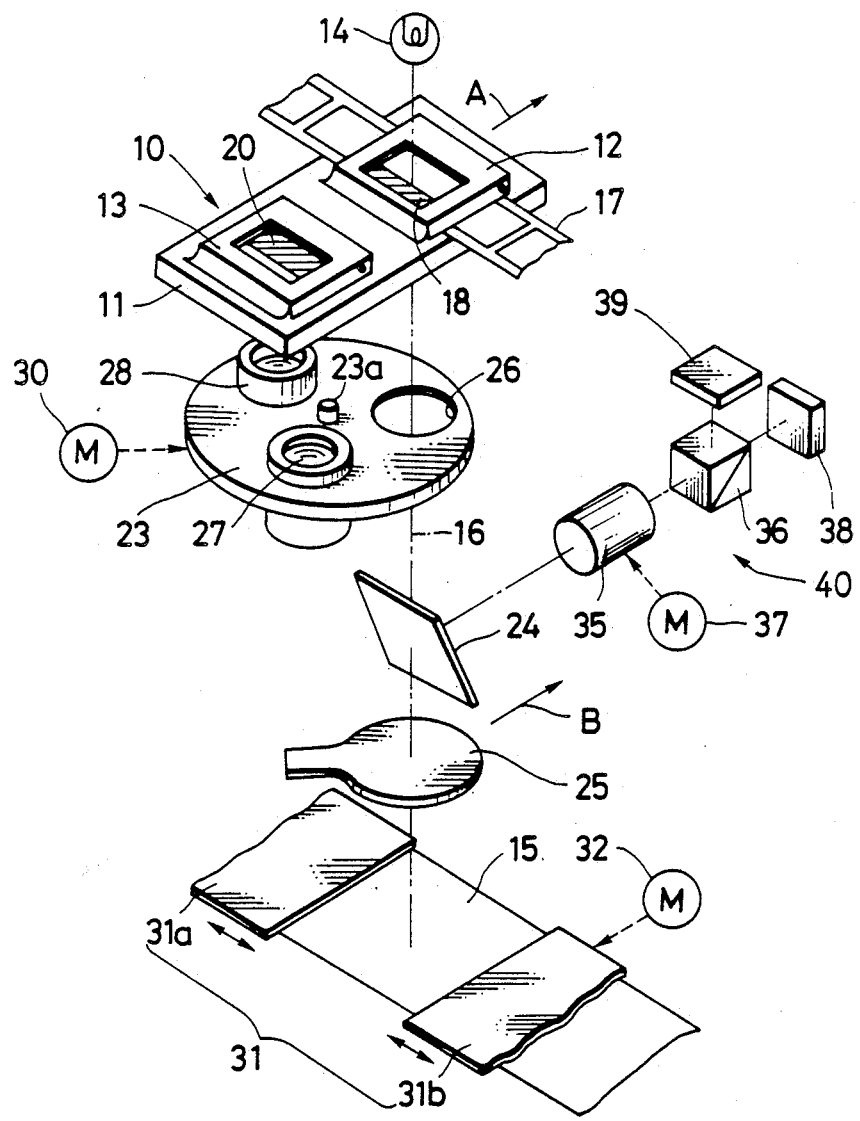
FIG. 1 is an exploded perspective view showing an optical system of a photographic printer with a color monitor embodying the present invention.

FIG. 1 shows an optical system of a printer embodying the method of the present invention. An original holder unit 10 consists of a slidable base plate 11, and a negative carrier 12 and stencil carrier 13 hinged to the slidable base plate 11. The slidable base plate 11 is disposed so as to slide in a plane perpendicular to a printing optical path 16 between a light source, such as a lamp 14, and a photographic paper 15. The negative carrier 12 holds an original, such as a negative film masked by a film mask 18 of opaque material with a cut out or opening 18a (shown in FIG. 2). The stencil plate carrier 13 holds a lithographic film stencil 19 as a stencil plate masked by means of a stencil mask 20 of opaque material with a cut out or opening 20a. Transparent words are formed in stencil fashion on the lithographic material.

A lens mount 23, a movable reflective mirror 24, and a shutter blade 25 are disposed in the printing optical path 16. The lens mount 23 is formed with a circular opening 26 and has two printing lenses 27 and 28, with different focal lengths, mounted thereon.

The lens mount 23 is rotatably mounted on a shaft 23a and is driven by a motor 30 so as to align any one of the printing lenses 27 and 28 and the circular opening 26 with the printing optical path 16. In cooperation with rotating the lens mount 23 so as to align the circular opening 26 with the printing optical path 16, the reflective mirror 24 is brought into the printing optical path 16 at an angle of 45°, and reflecting light is passed through the circular opening 26 to turn it at an angle of 90° toward a monitor optical system 40 which will be described in detail later. On the other hand, the alignment of the printing lens 27 or 28 in the printing optical path 16 causes the reflective mirror 24 to be moved out of the printing optical path 16.

A variable mask 31, disposed over the photographic paper 15, comprises a pair of opaque mask members 31a and 31b driven by a motor 32 to move away from or toward each other so as to vary an effective mask opening according to print sizes.

The monitor optical system 40 consists of a zoom lens 35 collecting the light reflected by the reflective mirror 24 to form an image of the negative film 17 or the lithographic film stencil 19 onto a color image sensor 38. A motor 37 drives this zoom lens 35 to adjust it in focal length and to provide a consistent predetermined image size on the color image sensor for all sizes of negative films. A beam splitter 36 is disposed between the zoom lens 35 and the color image sensor 38 so as to divide the light into two parts, one of which is directed to the color image sensor 38 so as to form an image thereon and the other to a scanner unit 39 for light measurement.

Figure 3:
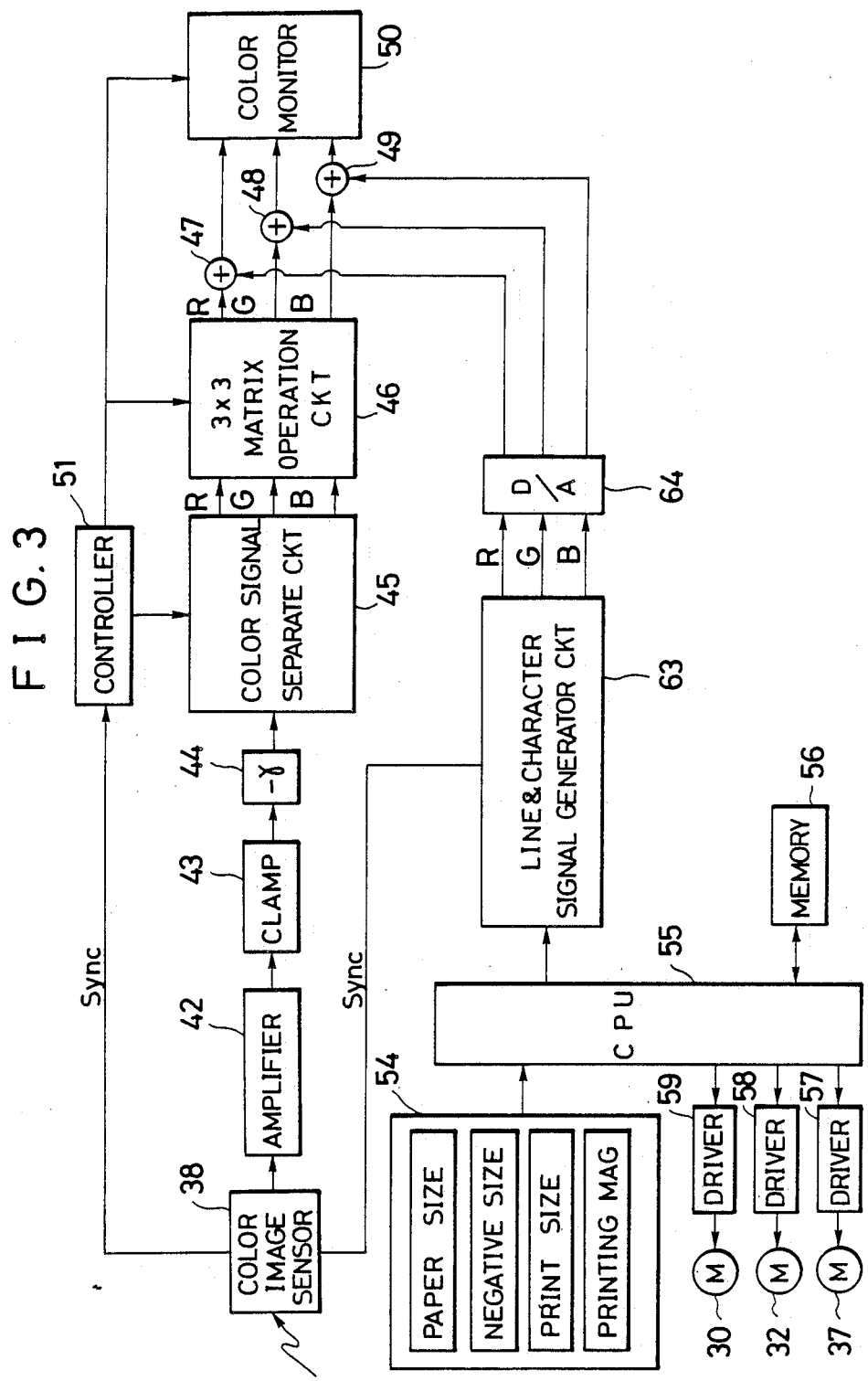
FIG. 3 is a block diagram showing an electronic structure of the printer shown in FIG. 1.

Referring to FIG. 3 showing image processing and associated circuitry, video signals provided by the color image sensor 38 are amplified by an amplifier 42 and are sent to a clamp circuit 43, where a reference voltage level is set. The video signals are then sent to a gamma ($-\gamma$) circuit 44 for gamma correction and negative-to-positive conversion. A color signal separation circuit 45 separates the video signals into three primary color signals, namely red, green and blue, which are subjected to a masking processing for simulation according to the property of the photographic paper 15 in a $3 \times 3$ matrix operation circuit 46. The three color video signals from the $3 \times 3$ matrix operation circuit 46 are sent to a color monitor 50 through adders 47 to 49 and displayed as a simulated positive color image on a screen of the color monitor 50.

A controller 51 connected to the color image sensor 38 controls the color signal separation circuit 45 and the $3 \times 3$ matrix operation circuit 46 with synchronizing signals provided by the color image sensor 38.

A keyboard 54, which has various keys, is provided to input various data, such as paper size, negative film size, print size, printing size and so forth, to a central processing unit (CPU) 55. A memory 56 stores various data on printing sequence, the relationship between negative sizes and focal lengths of the zoom lens 35, the relationship between print sizes and opening sizes of the variable mask 31, the relationship between printing sizes (magnification ratios) determined based on combinations of print sizes and negative film sizes and focal lengths of the printing lenses, etc.

When negative size data is input, the CPU 55 reads out the focal length data of the zoom lens 35 and causes a driver 57 to drive the motor 37 so as to adjust the focal length of the zoom lens 35 according to the read out negative size data, providing the predetermined size of image to be formed on the color image sensor 38. The CPU 55 also causes a driver 58 to drive the motor 32 so as to change the mask opening of the variable mask 31 according to the print size data input through the keyboard 54. The CPU 55 further causes a driver 59 to drive the motor 30 so as to place selectively the printing lens 27 or 28 in the printing optical path 16 according to the printing magnification ratio automatically obtained based either on the negative print sizes input through the keyboard or on a manually selected print magnification.

Figure 4:
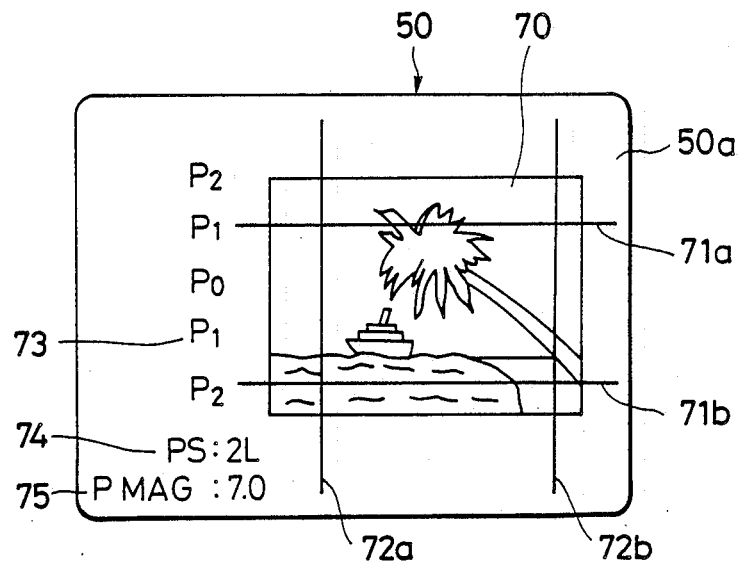
FIG. 4 shows a screen of the color monitor on which an ordinary image is displayed.

The CPU 55 calculates position data of an image display area on the screen of the color monitor 50 in which an image to be printed is displayed according to the adjusted opening size of the variable mask 31 and the designated printing size or magnification ratio. Looking at FIG. 4, this image area is defined by upper and lower frame lines 71a and 71b, and two side frame lines 72a and 72b. Signals indicating locations of the frame lines 71a, 71b, 72a and 72b on the screen of the color monitor 50 are stored in a frame line and character data (FCD) generating circuit 63. Simultaneously, the input print and printing size data are stored in the FCD generating circuit 63. The FCD generating circuit 63 generates frame line data and character data in synchronism with the scanning at the color monitor 50 by the aid of synchronizing signals from the color image sensor 38. It is noted in this embodiment that, because the frame lines and characters are displayed in gray, three color video signals for the frame lines and the characters are at the same level. After conversion into an analog form in a D/A converter 64, these frame line and character image signals are added to the three color video signals in the adders 47 to 49, respectively.

Referring again to FIG. 4, a screen surface 50a of the color monitor is illustrated, displaying an image 70 of the negative film 17 placed in an exposure station of the printer and the frame lines 71a, 71b, 72a and 72b defining an image area to be printed. The screen 50a displays thereon location marks 73, a print size mark 74 and a printing size mark 75.

Because, when designating a negative size and a print size, a printing size (magnification ratio) is automatically decided, edges of an image of the negative film 17 conform to the frame lines 71a, 71b, 72a and 72b if no trimming is taken. Trimming the image 70 can be made by shifting the frame lines 71a, 71b, 72a and 72b close to the center of the image 70. The shifting of the frame lines 71a, 71b, 72a and 72b is performed by inputting a different printing size through the keyboard 54.

To monitor a composed image to be printed, the lens mount 23 is turned so as to place the circular opening 26 thereof and the reflective mirror 24 in the printing optical path 16. When data are input through the keyboard 54 so as to specify the negative size of the negative film 17 placed in the exposure station of the printer and a desired print size, the zoom lens 35 is adjusted in focal length according to the specified negative size and, simultaneously, the variable mask 31 is adjusted in opening according to the specified print size. As described above, printing size is determined automatically based on the specified negative and print sizes, and the FCD generating circuit 63 generates data signals of locations of the frame lines 71a, 71b, 72a and 72b on the screen of the color monitor 50 according to the resulting printing size as well as data signals of characters indicating the print size and the printing size.

Figure 5:
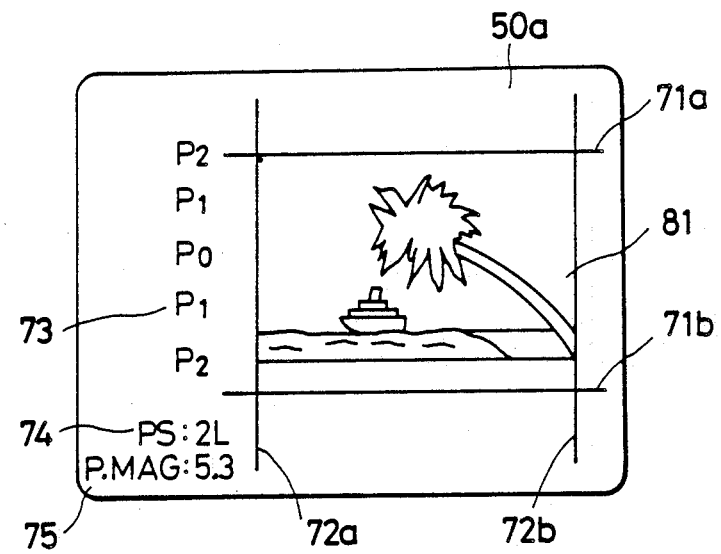
FIG. 5 shows the screen of the color monitor on which a composed image is displayed.

After conversion into analog form, the data signals are sent to the color monitor 50 through the adders 47 to 49 and are displayed as a visual image consisting of the frame lines 71a, 71b, 72a and 72b, and characters, such as the specified print size 74 and the calculated printing size 75, on the screen 50a, as shown in FIG. 5.

After setting the negative film 17 overlapped with the film mask 18 in the film carrier 12 and the lithographic film stencil 19 overlapped with the stencil mask 20 in the stencil carrier 13, the original holder unit 10 is slid in a direction shown by an arrow A in FIG. 1 so as to place the film carrier 12 in the exposure station of the printer. After passing through part 17a of the negative film 17 enclosed by the mask opening 18a of the film mask 18 and then the opening 26 of the lens mount 23, the light from the lamp 14 is reflected laterally at an angle of 90° by the reflective mirror 24 and is directed to the zoom lens 35. The zoom lens 35 focuses the light on the color image sensor to form an image of the negative film 17. A part of the light is reflected by the beam splitter 36 at an angle of 90° upwardly and is focused on the scanner 39. The color image sensor 38 converts the optical image into video signals by color. After being subjected to amplification, clamping, gamma correction, color separation and masking processing, the video signals are sent to the color monitor 50 and displayed as an simulated color image 81 as a subject image on the screen 50a of the color monitor 50 as shown in FIG. 5.

If the color subject image 81 does not match the image area defined by the frame line 71a, 71b, 72a and 72b, the negative film is slightly moved in any suitable direction or directions so as to overlap tightly the contour line of the color subject image 81 on the frame line 71a, 71b, 72a and 72b.

A print key (not shown) is operated after selecting a composing printing mode so as to start printing a composed image. Responding to the operation, the scanner is actuated to measure the negative film 17 held by the film carrier 12 so as to detect the transmission density of the negative film 17 based on which proper exposure for three colors are calculated. The exposures are corrected according to the changed size of the mask opening 18a of the variable mask 18. As is well known in the art, three color filters are adjusted in position in the printing optical path 16 according to the corrected exposures. Thereafter, the lens mount 23 is turned so as to place a proper printing lens 27 or 28 in the printing optical path 16. Simultaneously, the reflective mirror 24 moves in a direction shown by an arrow B in FIG. 1 and is removed from the printing optical path 16. Immediately after the removal of the reflective mirror 24, the shutter 25 is opened so as to allow the light passed through the negative film 17 to be focused on the photographic paper 15, thereby forming a latent image of the part 17a of the negative film 17 in the photographic paper 15.

Figure 2:
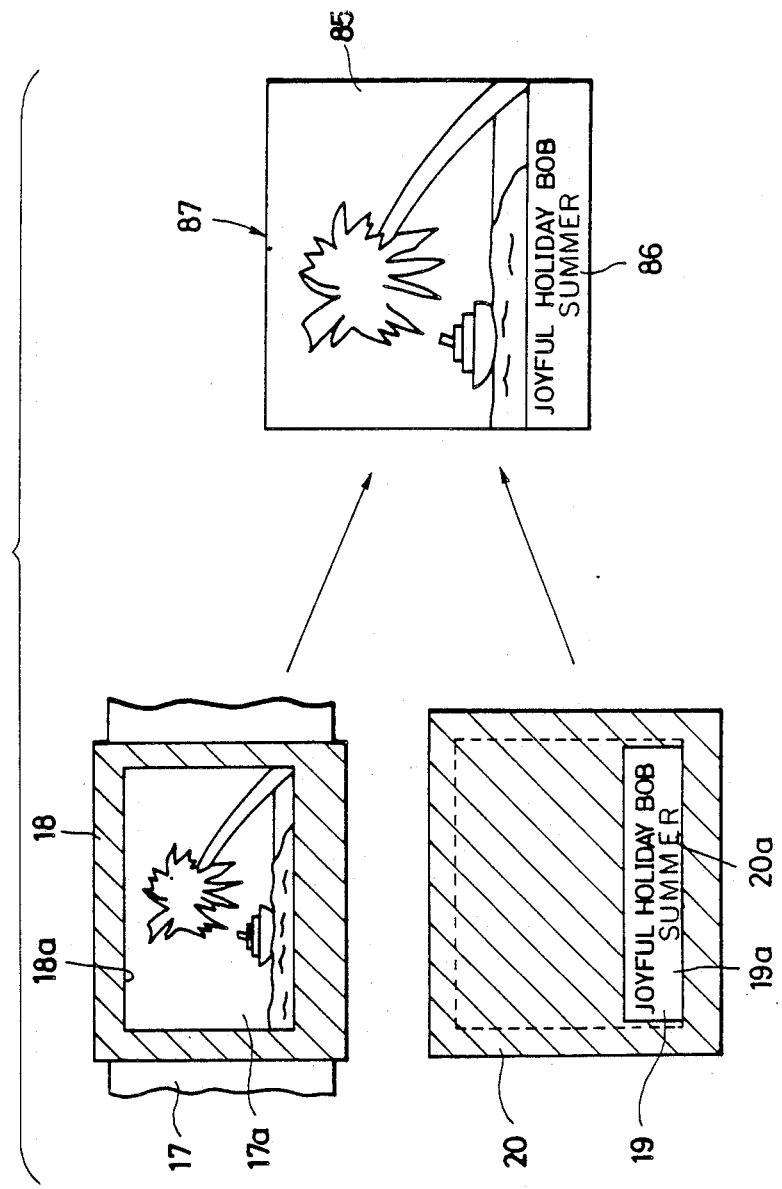
FIG. 2 is an illustration showing a method of image composing.
Figure 6:
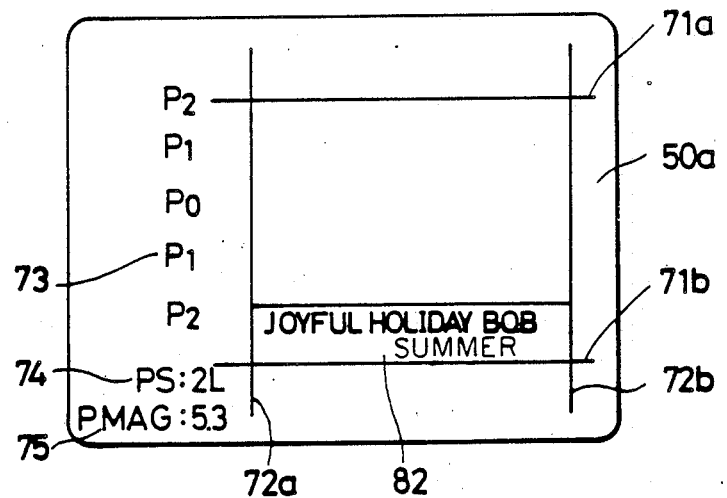
FIG. 6 shows the screen of the color monitor on which words to be composed are displayed.

The original holder unit 10 is slid to place the stencil carrier 13 in the printing optical path 16 so as to form an image of the lithographic film stencil 19 on the color image sensor 38, and displays the words or message 82 on the screen 50a of the color monitor 50, as shown in FIG. 6. In the same manner as for the color subject image 81, the words 82 are adjusted in location with respect to the frame lines 71a, 71b, 72a and 72b. After adjusting the location of the words 82, the print key is operated again so as to create a latent image of the words 82 on the photographic paper 15. The photographic paper 15, thus double exposed, is advanced by one frame so as to place an unexposed part in the exposure station. The exposed part of the photographic paper 15 is developed in a well known manner, providing a print 87 of a composed image comprising the subject image 85 and the words 86 as shown in FIG. 2.

If no words are to be printed, the original holding unit 10 carrying only the negative film 17 is set in the printer, and the print key is operated only once to carry out an ordinary printing procedure.

The words or message may be replaced with another picture image or an illustration, and the color CRT may be replaced with a liquid crystal display panel that now is commercially available.

Although the present invention has been fully described by way of the preferred embodiment thereof with reference to the accompanying drawings, various changes and modifications will be apparent to those skilled in the art. Therefore, unless otherwise these changes and modifications depart from the scope of the present invention, they should be construed as included therein.

What is claimed is:

1. A method of making a composed image on a photographic paper from two complementarily covered originals in a double exposure, comprising the steps of:
    displaying lines defining a square area in accordance with a printing magnification on a monitor screen;
    placing one of said two complementarily covered originals in a printing station of a printer so as to display an image of said one complementarily covered original in said square area on said monitor screen, so as to simulate a proper layout of said displayed image of said one complementarily covered original for framing;
    making an exposure of said one complementarily covered original to a photographic paper;
    placing the remaining complementarily covered original in said printing station of said printer so as to display an image of said remaining complementarily covered original in said square area on said monitor screen, so as to simulate a proper layout of said remaining complementarily covered original for framing; and
    making an exposure of said remaining complementarily covered original to said photographic paper.

2. A method as defined in claim 1, wherein said one complementarily covered original is a photographically recorded picture and the remaining complementarily covered original is an artificial original including at least one of a word and an illustration.

3. A method as defined in claim 1, wherein said lines move in parallel according to the ratio of a negative size relative to a print size.

4. A method of making a composed image on a photographic paper from two complementarily covered originals in a double exposure, comprising the steps of:
    displaying lines defining a printable area on a monitor screen;
    placing and shifting one of said two complementarily covered originals in a printing station of a printer so as to display an image of said one complementarily covered original at a desired location with respect to said lines on said monitor screen for framing; and
    placing and shifting the remaining complementarily covered original in said printing station of said printer so as to display an image of said remaining complementarily covered original at a desired location with respect to said lines on said monitor screen, so as to simulate separately a layout of said images of said two complementarily covered originals to be printed on a print.

* * * * *